Oct. 29, 1929.  C. MAUBORGNE  1,733,128
LOCKING DEVICE FOR AUTOMOBILES
Original Filed Aug. 31, 1926
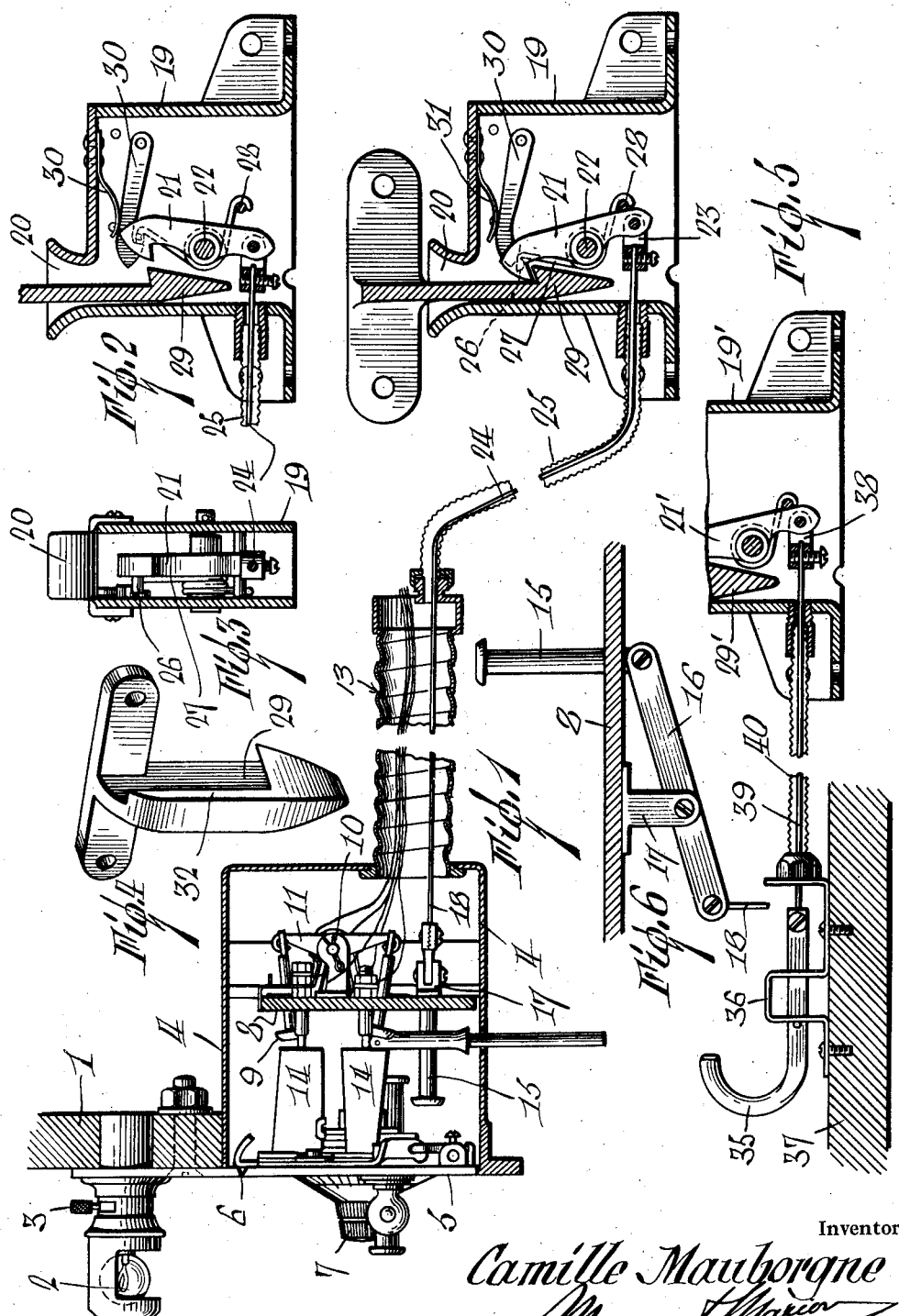
Inventor
Camille Mauborgne
By Marion & Marion
Attorneys Patented Oct. 29, 1929

1,733,128

UNITED STATES PATENT OFFICE

CAMILLE MAUBORGNE, OF MONTREAL, QUEBEC, CANADA

LOCKING DEVICE FOR AUTOMOBILES

Application filed August 31, 1926, Serial No. 132,839. Renewed June 4, 1929.

The present invention pertains to a novel locking device for automobiles constituting improvements on the device shown in my Canadian application No. 302,830, filed May 19, 1925, and corresponding United States application No. 33,579 filed May 28, 1925.

The particular object of the present invention is to provide a locking device operable from the dash-board for securing the hood to the frame of the vehicle. The box carried by the dash-board for containing other lock control parts described in the above mentioned applications also has a slidable push-rod adapted to actuate a locking device for the hood. The latter locking device comprises a hook carried by the hood and engageable by a latch pivoted to a fixed part of the vehicle. This latch is connected to the push rod and is retained in open position by a detent also pivoted to a fixed part of the vehicle. Thus, when the push rod is actuated to release the latch from the hook, the latch is held by the detent so that the hook may be withdrawn.

A similar locking mechanism is provided for the other side of the hood but is operable from a pull hook which is accessible when the first side of the hood is raised.

The invention is fully disclosed in the following description and in the accompanying drawings in which;

Figure 1 is a section of the device taken transversely of the automobile;

Figure 2 is a detail section of the hood lock, showing the same in open position;

Figure 3 is a section of the lock at right angles to Figure 2;

Figure 4 is a perspective view of the latch;

Figure 5 is a longitudinal section of the hood lock at the side opposite to that shown in Figure 1, and Figure 6 is a detail plan view of the push rod.

Reference to these views will now be made by use of like characters which are employed to designate corresponding parts throughout.

In Figure 1 the numeral 1 indicates the usual dash-board of the automobile. In this board is mounted a lamp 2 which is controlled by a switch 3.

Beneath the switch the dash-board supports a box 4 in which various control locking parts are mounted. The box is provided with a door 5 hinged at 6 and controlled by a combination lock 7. Within the box is formed a partition 8 in which are mounted a pair of push rods 9 accessible when the door 5 is open. On the inner side of the partition is mounted a bracket 10 to which are pivoted a pair of arms 11. These arms are adapted to control the flow of current, in combination with contact blades 14 at the open end of the box, through conductors 12 to various electrical parts of the vehicle as described more clearly in the above mentioned applications. These conductors are enclosed within a tube 13 as clearly shown in Figure 1.

Still another push rod 15 is slidably mounted in the partition 8 and is connected to a lever 16 fulcrumed on a lug 17 attached to the inner side of the partition. The other end of the lever is connected to a link 18 extending through the tube 13.

To the frame of the vehicle adjacent the hood is secured a housing 19 having a slot 20 in the top thereof. Within the housing and beneath the slot a latch 21 is pivoted on a spindle 22. The lower end of the latch carries a lug 23 which is connected to the rod 18 by a wire 24 enclosed in a flexible tube 25. The upper end of the latch carries a pin 26 engaged by a spring 27 wound around the spindle 22 and fixed to another pin 28 secured to the housing.

The portion of the hood which lies adjacent the box 19 has a hooked member 29 secured thereto as shown in detail in Figure 4. The hook is engageable by the head of the latch 21 as illustrated in Figure 1. In the upper part of the housing 19 is pivoted a detent 30 adapted to engage the pin 26. The detent is normally depressed by a flat spring 31 secured to the top of the housing.

In the use of this device the door 5 is first opened by the lock 7 so that the push rod 15 is accessible. This rod is pushed through the partition 8 whereupon the wires 18 and 25 are drawn towards the partition and the latch 21 swung away from the hook 29. The latch is now held in retracted position by the detent 30 which immediately engages the pin 26. It will be seen from Figure 2 that the detent still lies in the path of the hook, and when the hood is raised the hook releases the detent from the pin 26 and allows the latch 21 to be moved under the slot by the action of the spring 27. When the hook is again lowered into the casing 19 it is readily engaged by the latch. The hook is formed with a lip 32 at one edge for guidance along one of the ends of the slot 20.

Figure 5 illustrates a device for locking the other side of the hood in case the latter is releasable. This device comprises a pull hook 35 slidable in a bracket 36 secured to a fixed support 37. The actual locking apparatus comprises a housing 19', latch 21' and hook 29' corresponding to the members 19, 21 and 29 already described. The lower end of the latch 21' carries a lug 38 connected to the hook 35 by a wire 39 enclosed in a tube 40. On raising the side of the hood carrying the hook 29 in the manner already described, the pull hook 35 becomes accessible and may be drawn to release the hook 29' from the latch 21'.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:

1. A locking device for the hood of an automobile comprising a latch pivotally mounted near said hood, a hook carried by the hood and engageable by the latch, a push rod mounted near the dash board of the automobile, a connection between said push rod and latch, and a detent pivoted near said latch and adapted to engage and hold the same in released position.

2. A locking device for the hood of an automobile comprising a housing mounted near the hood and having a slot in its top, a hook carried by the hood and adapted to pass through said slot into the housing, a latch pivoted to said housing and adapted to engage said hook, a push rod connected to said latch, and a detent pivoted in said housing and adapted to engage said latch.

3. A locking device for the hood of an automobile comprising a housing mounted near the hood and having a slot in its top, a hook carried by the hood and adapted to pass through said slot into the housing, a latch pivoted to said housing and adapted to engage said hook, a push rod connected to said latch, a detent pivoted in said housing and adapted to engage said latch, a box enclosing said push rod, a hinged board for closing said box, and a lock carried by said board.

In witness whereof I have hereunto set my hand.

CAMILLE MAUBORGNE.